Sept. 4, 1928.

A. E. ANDERSON 1,683,227

ELECTRICAL DISTRIBUTION SYSTEM

Filed Feb. 9, 1925

Inventor:
Arvid E. Anderson,
by
His Attorney

Patented Sept. 4, 1928.

1,683,227

UNITED STATES PATENT OFFICE.

ARVID E. ANDERSON, OF SCOTIA, NEW YORK, ASSIGNOR TO GENERAL ELECTRIC COMPANY, A CORPORATION OF NEW YORK.

ELECTRICAL-DISTRIBUTION SYSTEM.

Application filed February 9, 1925. Serial No. 7,776.

My invention relates to systems of electrical distribution and particularly to a system in which electrical energy is transferred from one circuit to another by suitable rotary transforming means such as synchronous converters, motor generator sets, etc.

In systems of electrical distribution employing rotary transformers between a supply circuit and a load circuit it is desirable to maintain the rotary converters connected to the supply circuit during momentary interruptions in the supply circuit voltage and one object of my invention is to provide an improved arrangement for effecting this result.

Another object of my invention is to provide an improved arrangement for controlling the connection between a rotary transformer and one of the circuits to which it is connected so as to prevent it from operating invertedly and supplying an excessive current to a fault on the supply circuit when the load circuit is supplied by other sources, and for establishing the normal connections between the transformer and both circuits as soon as normal conditions are restored on the supply circuit and the transformer is in a proper condition to supply electrical energy to the load circuit.

Figure 1:
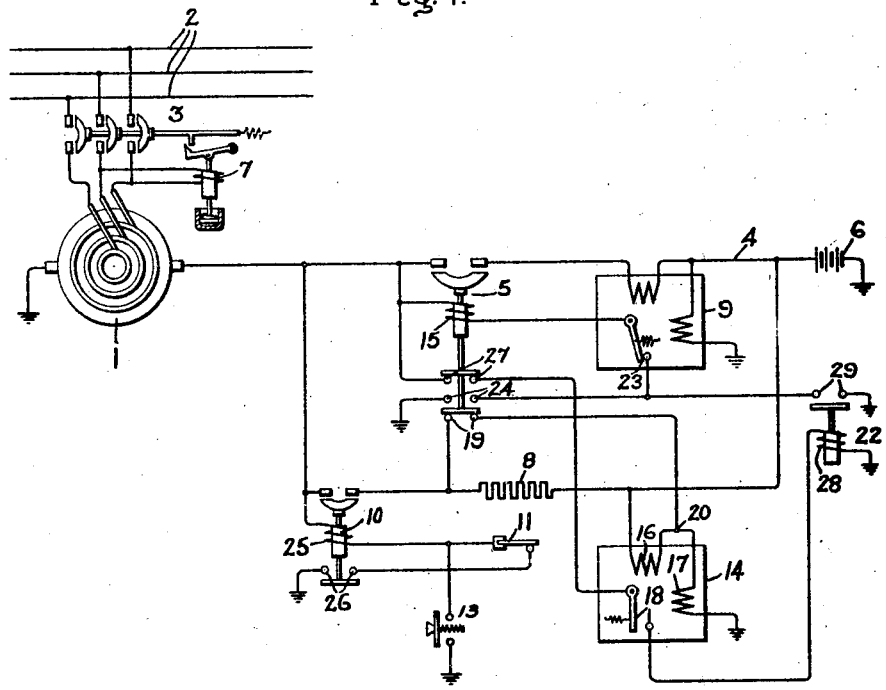
Figure 2:
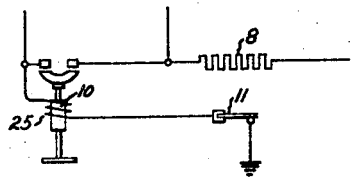

My invention will be better understood from the following description taken in connection with the accompanying drawing and its scope will be pointed out in the appended claims. Fig. 1 is a diagrammatic showing of a system of electrical distribution embodying my invention, and Fig. 2 is a modification of a portion of the system shown in Fig. 1.

Referring to Fig. 1 of the drawing, 1 is a rotary transformer, shown as a synchronous converter, which is adapted to be connected to an alternating current supply circuit 2 by suitable switching means 3, shown as a latched-in circuit breaker, and to a direct current load circuit 4 by suitable switching means 5, shown as a contactor. The load circuit 4 also is supplied with another suitable source 6, shown as a battery, so that the load circuit is not deenergized when the supply circuit 2 fails. As shown, the ground is the return conductor of the load circuit 4 but it is evident that it is immaterial whether a ground return or a metallic return is used.

Under normal operating conditions, electrical energy is supplied from the supply circuit 2 to the load circuit 4 by the converter 1 when both of the circuit breakers 3 and 5 are closed.

In order to prevent the circuit breaker 3 from opening in response to momentary low voltage on the supply circuit, any suitable means, examples of which are well known in the art, may be provided for delaying the opening of the circuit breaker 3 under such conditions until a predetermined length of time after the voltage has decreased below a predetermined value. As shown, a time delay low voltage release magnet 7 is provided for this purpose. The coil of the magnet 7 is connected across the supply circuit so that it is energized by the voltage thereof.

Since the load circuit 4 is supplied by a source other than the converter 1, it is evident that if the converter remains connected to both the supply and load circuits when a short circuit occurs on the supply circuit which causes the voltage thereof to decrease momentarily to a low value, the converter operates invertedly and supplies current to the short circuit connected to the supply circuit. In order to limit the amount of current that the converter can supply to the faulty supply circuit under such conditions, I provide an arrangement for inserting suitable current limiting means in series between the converter and one of the circuits, to which it is connected, when the supply circuit voltage fails. This result is accomplished by means of a resistor 8 which is arranged to be connected in series between the converter 1 and the direct current circuit 4, and a directional relay 9 which is connected and arranged so that it effects the opening of the circuit breaker 5 when current flows from the load circuit 4 to the converter 1. In order to reduce the cost and size of the resistor 8, it is desirable to use a resistor which is capable of dissipating the electrical energy consumed therein only for a short time without becoming excessively heated. Therefore, I prefer to use a suitable arrangement whereby the resistor in disconnected in case an abnormal condition occurs which causes the resistor to remain connected in circuit for a sufficient length of time to become excessively heated. In the arrangement shown, this result is obtained by means of a circuit breaker 10 of any suitable type which connects the resistor 8 in series with the converter 1 and the load circuit 4, and a thermostat 11 which is placed in close thermal relationship with the resistor 8, and which effects the opening of the circuit breaker 10 when the temperature of the resistor 8 exceeds a predetermined value. For effecting the closing of the circuit breaker 10 after it has been opened a suitable switch 13 is provided for completing the closing circuit of the circuit breaker.

In case the supply circuit voltage is restored before the circuit breaker 3 is opened by the operation of the low voltage release magnet 7, it is desirable to reclose the circuit breaker 5 as soon as the direct current voltage of the converter exceeds the voltage across the load circuit 4. This result is accomplished by the directional relay 14, which is connected and arranged so that the circuit of the closing coil 15 of the circuit breaker 5, when it is open, cannot be completed until the direct current voltage of the converter 1 exceeds the voltage across the load circuit 4 by a predetermined value. The directional relay 14 may be of any suitable construction. As shown, it comprises windings 16 and 17. The connections of the windings 16 and 17 are such that when the circuit breaker 5 is closed the two windings 16 and 17 are connected in series across the load circuit 4 and current flows through these windings in such a direction that the relay 14 maintains its contacts 18 open. When the circuit breaker 5 is open the auxiliary contacts 19 on the circuit breaker 5 connect the point 20 between the two windings 16 and 17 to the ungrounded brush of the converter so that the winding 17 is connected across the direct current brushes of the converter and the winding 16 is connected across the resistor 8. This change in the connections of the windings 16 and 17, when the circuit breaker 5 is opened, does not change the direction of current through the voltage winding 17. The direction of the current through the winding 16, however, depends upon relative voltages of the converter 1 and the load circuit 4. If the load circuit voltage is higher than the converter voltage, current flows through the winding 16 in a direction to maintain the contacts 18 open. If the converter voltage is higher then the load circuit voltage, current flows through the winding 16 in the opposite direction, and when the voltage difference exceeds a predetermined value, the relay 14 closes its contacts 18. The closing of the contacts 18 completes the circuit of a control relay 22, which in turn completes the circuit of the closing coil 15 of the circuit breaker 5. The particular arrangement shown for controlling the closing of a circuit breaker in accordance with the relative voltages of the two circuits which the circuit breaker is arranged to connect together is disclosed and claimed in a copending application, Ser. No. 689,146 filed January 28, 1924, by Glen E. Stewart and assigned to the same assignee as this application.

The operation of the arrangement shown is as follows: Under normal operating conditions the circuit breaker 5 is held closed by the coil 15, the circuit of which is from the ungrounded brush of the converter 1, through the coil 15, contacts 23 of the directional relay 9, which are maintained closed so long as current does not flow from the load circuit to the converter, auxiliary contacts 24 on the circuit breaker 5 to the grounded brush of the converter. The circuit breaker 10 also is in its closed position, the circuit for its closing coil being from the ungrounded terminal of the converter 1 through the coil 25 of the circuit breaker 10, thermostat 11, auxiliary contacts 26 on the circuit breaker 10 to the grounded brush of the converter. The switch 13 is open under the assumed condition. This switch is closed only to complete a circuit for the coil 25 to close the circuit breaker after it has been opened. It will be observed that whenever the circuit of the coil 25 is opened by the thermostat 11, the subsequent closing of the thermostat contacts does not complete the circuit of the coil 25 because the contacts 26 are open. The closing of the switch 13 completes a circuit which is in shunt to the thermostat and contacts 26. As soon as the circuit breaker 10 closes and completes a locking circuit for the coil 25 through its contacts 26 the switch 13 is opened.

When a fault or some other abnormal condition occurs on the supply circuit 2 which causes the voltage thereof to decrease below a predetermined value, the converter 1 operates invertedly so that instead of supplying current to the load circuit 4 it receives current from the load circuit 4 and supplies current to the supply circuit 2. As soon as the direction of the current between the converter and the load circuit 4 reverses, the directional relay 9 opens its contacts 23 so that the coil 15 is deenergized and the circuit breaker 5 opens. When the circuit breaker 5 opens, the amount of current supplied to the converter 1 is decreased due to the resistor 8 being connected in series between the converter and the load circuit 4.

If the abnormal condition on the supply circuit 2 lasts only a very short time, the time delay low voltage release magnet 7 does not have time to effect the opening of the circuit breaker 3. As soon as the normal conditions are restored on the supply circuit so that the voltage across the direct current brushes of the converter is higher than the load circuit voltage, which is the condition necessary for the converter to supply current to the load circuit, the directional relay 14 closes its contacts 18 and completes a circuit for the control relay 22. This circuit is from the undergrounded brush of the converter, through the auxiliary contacts 27 on the circuit breaker 5, contacts 18 of the directional relay 14, coil 28 of the relay 22 to the grounded brush of the converter. The closing of the contacts 29 of the control relay 22 completes a circuit for the closing coil 15 of the circuit breaker 5 to close the circuit breaker. This circuit is from the undergrounded brush of the converter 1, through the coil 15, contacts 23 of the directional relay 9, contact 29 of the control relay 22 to the grounded brush of the converter. The closing of the auxiliary contacts 24 completes the heretofore described circuit of the coil 15, which is independent of the contacts 29 of the control relay 22. The opening of the contacts 27 opens the circuit of the coil 28 of the control relay 22. The opening of the contacts 19 disconnects the point 20 from the ungrounded brush of the converter 1 so that the windings 16 and 17 are connected in series across the load circuit 4 and, as heretofore described, current flows through the windings 16 and 17 in such a manner when they are so connected that the contacts 18 are opened. The purpose of opening the contacts 18 in this manner is to insure that the control relay 22 is not energized to effect the closing of the circuit breaker when the auxiliary contacts 27 are closed by the opening of the circuit breaker.

In case the abnormal condition on the supply circuit does not clear itself in a very short time the resistor 8 becomes sufficiently heated to cause the thermostat 11 to open the circuit of the coil 25, thereby opening the circuit breaker 10 and disconnecting the converter 1 from the load circuit 4. When it is desirable again to connect the converter to the load circuit 4, the switch 13 is closed manually to complete the circuit of the coil 25. The directional relay 14 then operates in the manner heretofore described to effect the automatic closing of the circuit breaker when the converter voltage is higher than the load circuit voltage.

If the supply circuit voltage remains below a predetermined value for a predetermined length of time when a fault occurs on the supply circuit, the time delay low voltage release magnet 7 trips the circuit breaker 3, thereby disconnecting the converter 1 from the supply circuit 2. The relay 7 may be part of a complete automatic switching equipment for the converter 1, examples of which are well known in the art.

It may be desirable in some cases to close the circuit breaker 10 automatically as soon as the resistor 8 has cooled. This may be accomplished merely by omitting the contacts 26 in the circuit of the coil 25 as shown in Fig. 2. With such an arrangement the circuit breaker 10 is closed whenever the thermostat contacts are closed. Any other suitable means, however, may be used for accomplishing this result.

While I have, in accordance with the patent statutes, shown and described my invention as applied to a particular system and embodying various devices diagrammatically shown, changes and modifications will be obvious to those skilled in the art and I, therefore, aim in the appended claims to cover all such changes and modifications as fall within the true spirit and scope of my invention.

What I claim as new and desire to secure by Letters Patent in the United States is:—

1. In a system of electrical distribution, a supply circuit, a load circuit arranged to be supplied with current by a plurality of sources, a rotary transformer for transferring electrical energy from one of said circuits to the other, current limiting means, means responsive to the direction of the current flowing between said transformer and said load circuit for effecting the connection of said current limiting means in series between said rotary transformer and one of said circuits when said rotary transformer transfers energy from said load circuit to said supply circuit, and a relay comprising a winding connected in parallel with said current limiting means for effecting the connection of said one of said circuits directly to said rotary converter when said rotary converter is in a condition to transfer energy from said supply circuit to said load circuit.

2. In a system of electrical distribution, an alternating current supply circuit, a direct current load circuit arranged to be supplied with current by a plurality of sources, a rotary transformer adapted to be connected between said circuits, current limiting means, a relay responsive to the direction of the current flowing between said transformer and said load circuit for effecting the connection of said current limiting means in series between said transformer and said load circuit when said rotary transformer transfers energy from said load circuit to said supply circuit, and another relay responsive to the direction of the current flowing through said current limiting means for effecting the connection of said load circuit directly to said transformer only when the direct current voltage of said transformer is higher than the voltage of said load circuit.

3. In a system of electrical distribution, a supply circuit, a load circuit arranged to be supplied with current by a plurality of sources, a rotary transformer, circuit breakers for connecting said transformer to said circuits, current limiting means arranged to be connected in series between said transformer and said load circuit when the circuit breaker between said transformer and said load circuit is open, a directional relay for effecting the opening of said circuit breaker when current flows from said load circuit to said transformer, and another directional relay operative to effect the closing of said last mentioned circuit breaker only when it is open and the voltage of the transformer exceeds the voltage across the load circuit by a predetermined amount.

4. In a system of electrical distribution, two electric circuits, a circuit breaker for connecting said circuits together, a closing coil for said circuit breaker, a circuit for said coil, a directional relay having a winding connected so that the direction of the current flowing in the winding varies with the direction of the current flowing between said two electric circuits when said circuit breaker is closed, contacts in said closing coil circuit controlled by said directional relay so as to effect the opening of said circuit breaker when current flows in a certain direction between said electric circuits, a resistor arranged to be connected in series between said electric circuits when said circuit breaker is open, another directional relay having a winding connected so that the direction of the current flowing in the winding varies with the direction of the current flowing through the resistor, and contacts in said closing coil circuit controlled by said last mentioned directional relay so as to effect the closing of said circuit breaker only when current flows in a certain direction through said resistor.

5. In a system of electrical distribution, a supply circuit, a load circuit arranged to be supplied with current by a plurality of sources, a rotary transformer connected between said supply circuit and said load circuit, current limiting means, means operative to effect the connection of said current limiting means in series between said transformer and one of said circuits when a current flows from said load circuit to said transformer, means responsive to a predetermined condition of said transformer for reconnecting said transformer directly to said one of said circuits and means for disconnecting said current limiting means when the temperature thereof exceeds a predetermined value.

6. In a system of electrical distribution, a supply circuit, a load circuit arranged to be supplied with current by a plurality of sources, a rotary transformer connected between said supply and load circuits, a current limiting resistor, means operative to effect the connection of said resistor in series between said transformer and said load circuit when current flows from said load circuit to said transformer, means responsive to a predetermined condition of said transformer for reconnecting said transformer directly to said one of said circuits, and means for disconnecting said resistor from a series relation between said transformer and said load circuit when the temperature thereof exceeds a predetermined value and for reconnecting said resistor in series when the temperature thereof subsequently decreases below a predetermined value.

7. In a system of electrical distribution, a supply circuit, a load circuit arranged to be supplied with current by a plurality of sources, a rotary transformer connected to said supply circuit, a circuit breaker for connecting said transformer to said circuit, a current limiting resistor arranged to be connected in series between said transformer and said load circuit when said circuit breaker is open, electro-responsive switching means connected in series with said resistor, a directional relay for effecting the opening of said circuit breaker when current flows from said load circuit to said transformer, means responsive to a predetermined condition of said transformer for reclosing said circuit breaker and a thermostat responsive to the temperature of said resistor for effecting the operation of said electro-responsive switching means to disconnect said resistor from between said transformer and said load circuit when the temperature of said resistor exceeds a predetermined value.

In witness whereof, I have hereunto set my hand this 7th day of February, 1925.

ARVID E. ANDERSON.